(12) United States Patent
Fleischman et al.

(10) Patent No.: US 10,762,698 B2
(45) Date of Patent: *Sep. 1, 2020

(54) AUTOMATED SPATIAL INDEXING OF IMAGES BASED ON FLOORPLAN FEATURES

(71) Applicant: Open Space Labs, Inc., San Francisco, CA (US)

(72) Inventors: Michael Ben Fleischman, Los Angeles, CA (US); Philip DeCamp, Boulder, CO (US); Jeevan Kalanithi, San Francisco, CA (US); Thomas Friel Allen, El Cerrito, CA (US)

(73) Assignee: Open Space Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,625

(22) Filed: Sep. 27, 2019

(65) Prior Publication Data

US 2020/0027267 A1 Jan. 23, 2020

Related U.S. Application Data

(63) Continuation of application No. 16/022,477, filed on Jun. 28, 2018, now Pat. No. 10,467,804.

(Continued)

(51) Int. Cl.
*G06T 17/05* (2011.01)
*H04N 13/204* (2018.01)
(Continued)

(52) U.S. Cl.
CPC .............. *G06T 17/05* (2013.01); *G06F 16/51* (2019.01); *G06T 7/30* (2017.01); *G06T 7/579* (2017.01);
(Continued)

(58) Field of Classification Search
None
See application file for complete search history.

(56) References Cited

U.S. PATENT DOCUMENTS 7,639,943 B1 12/2009 Kalajan
8,270,767 B2 9/2012 Park
(Continued)

FOREIGN PATENT DOCUMENTS

CN 101055494 A 10/2007

OTHER PUBLICATIONS

Chang, S-F. et al., "A Fully Automated Content-Based Video Search Engine Supporting Spatiotemporal Queries," IEEE Transactions on Circuits and Systems for Video Technology, vol. 8, No. 5, Sep. 1998, pp. 602-615.
(Continued)

*Primary Examiner* — Hilina K Demeter
(74) *Attorney, Agent, or Firm* — Fenwick & West LLP

(57) ABSTRACT

A spatial indexing system receives a sequence of images depicting an environment, such as a floor of a construction site, and performs a spatial indexing process to automatically identify the spatial locations at which each of the images were captured. The spatial indexing system also generates an immersive model of the environment and provides a visualization interface that allows a user to view each of the images at its corresponding location within the model.

20 Claims, 13 Drawing Sheets

Related U.S. Application Data

(60) Provisional application No. 62/526,805, filed on Jun. 29, 2017.

(51) Int. Cl.
    *G06T 7/30* (2017.01)
    *G06T 7/73* (2017.01)
    *G06F 16/51* (2019.01)
    *G06T 7/579* (2017.01)
    *G06T 19/00* (2011.01)

(52) U.S. Cl.
    CPC ............ *G06T 7/73* (2017.01); *G06T 7/75* (2017.01); *G06T 19/003* (2013.01); *H04N 13/204* (2018.05); *G06T 2207/20076* (2013.01); *G06T 2207/20081* (2013.01); *G06T 2207/30241* (2013.01); *G06T 2207/30244* (2013.01); *G06T 2210/04* (2013.01)

(56) References Cited

U.S. PATENT DOCUMENTS

| | | | |
|---|---|---|---|
| 8,705,893 B1* | 4/2014 | Zhang | G06K 9/00201 345/418 |
| 9,445,081 B1 | 9/2016 | Kouperman et al. | |
| 9,990,760 B2 | 6/2018 | Perez et al. | |
| 10,127,721 B2 | 11/2018 | Upendran et al. | |
| 10,139,985 B2 | 11/2018 | Mildrew et al. | |
| 10,163,271 B1* | 12/2018 | Powers | G06T 19/20 |
| 2006/0221072 A1* | 10/2006 | Se | G06T 7/593 345/420 |
| 2007/0110338 A1* | 5/2007 | Snavely | G06K 9/32 382/305 |
| 2008/0069480 A1 | 3/2008 | Aarabi et al. | |
| 2011/0261049 A1 | 10/2011 | Cardno et al. | |
| 2012/0194644 A1 | 8/2012 | Newcombe et al. | |
| 2013/0222583 A1 | 8/2013 | Earnshaw | |
| 2013/0300740 A1* | 11/2013 | Snyder | G06F 3/016 345/420 |
| 2014/0043436 A1 | 2/2014 | Bell et al. | |
| 2014/0288890 A1 | 9/2014 | Khainson et al. | |
| 2014/0320661 A1 | 10/2014 | Sankar et al. | |
| 2015/0248916 A1* | 9/2015 | Kopf | G06T 5/002 386/278 |
| 2016/0148433 A1* | 5/2016 | Petrovskaya | G02B 27/01 345/633 |
| 2016/0305785 A1 | 10/2016 | Nishijima et al. | |
| 2016/0350906 A1 | 12/2016 | Meier et al. | |
| 2017/0018086 A1 | 1/2017 | Zhang | |
| 2017/0094165 A1 | 3/2017 | Meadow et al. | |
| 2018/0075168 A1 | 3/2018 | Tiwari et al. | |

OTHER PUBLICATIONS

PCT International Search Report and Written Opinion, PCT Application No. PCT/US2019/060784, dated Jan. 31, 2020, 15 pages.
PCT International Search Report and Written Opinion, PCT Application No. PCT/US18/40123, dated Sep. 6, 2018, 14 pages.
United States Office Action, U.S. Appl. No. 16/022,477, dated May 24, 2019, 21 pages.
United States Office Action, U.S. Appl. No. 16/022,477, dated Jan. 30, 2019, 16 pages.

* cited by examiner

AUTOMATED SPATIAL INDEXING OF IMAGES BASED ON FLOORPLAN FEATURES

CROSS-REFERENCE TO RELATED APPLICATION

This application is a continuation of U.S. patent application Ser. No. 16/022,477, filed Jun. 28, 2018, which claims the benefit of U.S. Provisional Application No. 62/526,805, filed Jun. 29, 2017, which is hereby incorporated by reference in its entirety.

TECHNICAL FIELD

This disclosure relates to identifying spatial locations on a floorplan at which images in a sequence were captured and generating an immersive model that allows a user to view the images at their respective locations on the floorplan.

BACKGROUND

Location-tagged photography has a wide variety of uses in indoor spaces. For example, a realtor may wish create a virtual tour of a house by capturing a series of 360-degree photographs of the rooms in a house and tagging each photograph with its position within the house. Similarly, a general contractor may wish monitor progress on a construction site by capturing and adding location tags to 360-degree photographs of the construction site.

Conventionally, when a user captures multiple pictures of an indoor space, the user must manually annotate each image with its location within the space. Requiring the user to manually add location tags to each image can be inefficient and time-consuming.

SUMMARY

A spatial indexing system receives a sequence of images depicting an environment and performs a spatial indexing process to automatically identify the spatial locations at which each of the images were captured. The images are captured by an image capture system as the image capture system is moved through the environment along a camera path. In one embodiment, the spatial indexing system performs a simultaneous localization and mapping (SLAM) algorithm on the images to estimate the camera path and generate a model of the environment. The camera path estimate that is generated with the SLAM algorithm can optionally be combined with motion data, location data, or a floorplan of the environment to generate a combined estimate of the camera path. The spatial indexing system can then determine the location at which each of the images was captured and provide a visualization interface that provides an immersive view of each of the images at its corresponding location within the model of the environment.

The automated spatial indexing process can be performed without requiring the user to manually annotate each image with its location. This is particularly advantageous in situations where a large number of images are captured at once or where images of the same space are captured at regular time intervals (e.g., every couple of days) in order to monitor changes within the space over a period of time.

DETAILED DESCRIPTION

I. Overview

Figure 1:
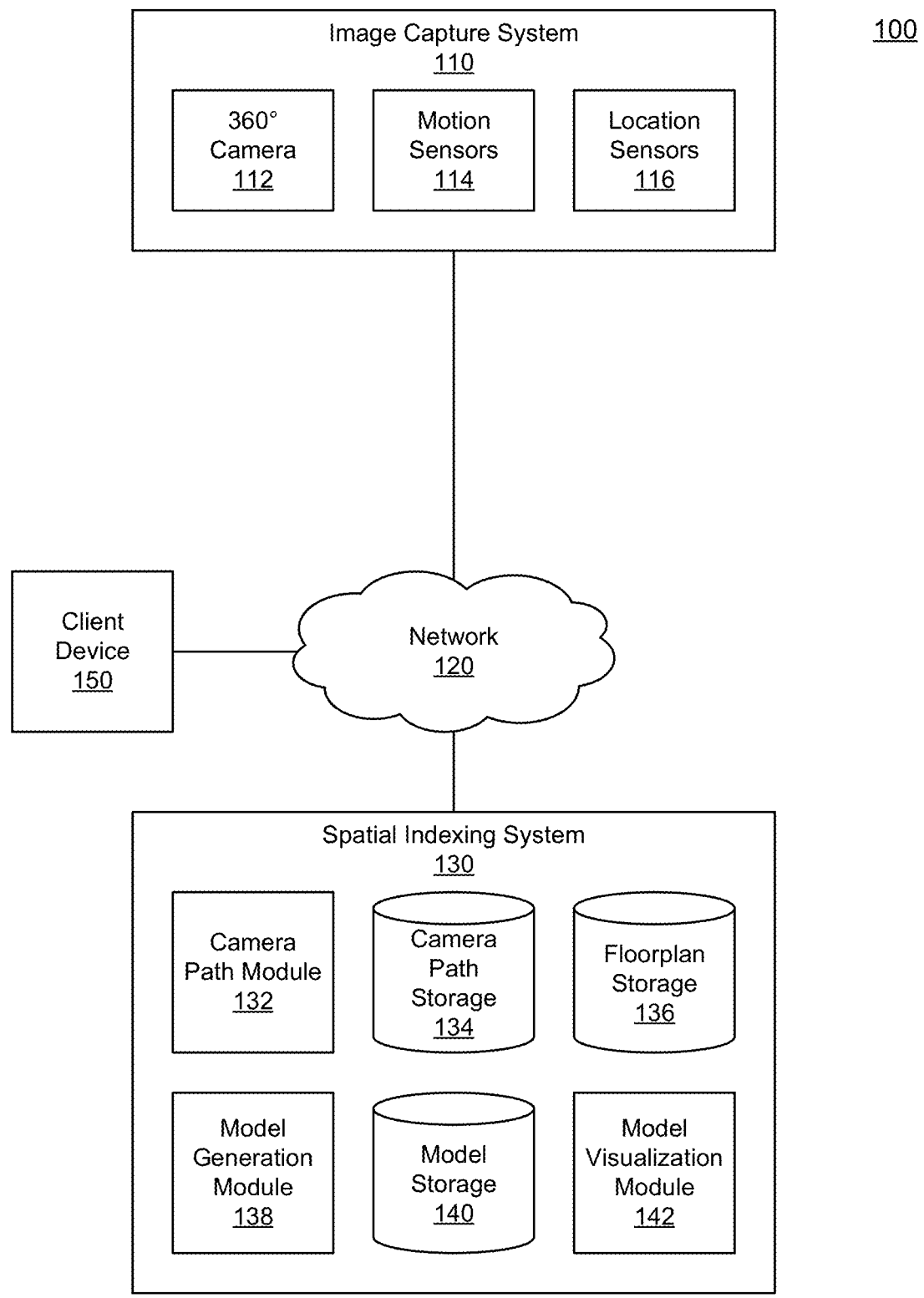
FIG. 1 illustrates a system environment for a spatial indexing system, according to one embodiment.

A spatial indexing system receives a sequence of images depicting an environment, such as a floor of a construction site, and performs a spatial indexing process to automatically identify the spatial locations at which each of the images were captured. The spatial indexing system also generates an immersive model of the environment and provides a visualization interface that allows a user to view each of the images at its corresponding location within the immersive model. This enables the user to quickly navigate to a specific image by selecting the location at which the image was recorded.

In some cases, spatial indexing is performed by recording location data generated by a GPS receiver and location tagging each image as the image is captured. Another option is to use an indoor positioning system (IPS) that generates location data based on signals received from transmitters placed at known locations in the environment. For example, an IPS receiver may generate location data based on RF fingerprints transmitted by multiple radio frequency (RF) transmitters that are placed throughout the environment. However, these approaches become unreliable in environments where GPS signals are substantially attenuated or where an indoor positioning system not available. For example, in indoor environments, interference from structural elements such as steel beams can substantially attenuate GPS signals and drastically reduce the accuracy of locations generated by a GPS. As another example, an indoor positioning system is often not available in active construction sites often due to cost and robustness issues. In such environments, the user would ordinarily have to manually annotate each captured image with its location, which can be time-consuming and inefficient.

Rather than having the user manually annotate the captured images with their locations, the spatial indexing process can instead determine the locations of the images by applying a simultaneous localization and mapping (SLAM) algorithm to the sequence of images. The SLAM algorithm estimates a six-dimensional (6D) camera pose (i.e., a 3D translation and a 3D rotation) for each of the images. This sequence of 6D camera poses is represented within the immersive model of the environment. In one embodiment, the visualization interface displays the immersive model of the environment as both a 2D map and a first-person view. Each image is represented on the 2D map as an icon at the location at which the image was captured. The user can select an icon to display the image that was captured at the corresponding location. The first-person view displays an immersive view of a single 360-degree image that the user can pan and zoom. The first-person view can also include waypoint icons representing the relative locations of other images in the immersive model, and the user can select a waypoint icon to display a first-person view of the image captured at the corresponding location.

The sequence of images is captured by an image capture system as it is moved through the environment along a camera path. For example, the environment may be a floor of a building that is under construction, and the sequence of images is captured as a construction worker walks through the floor with the image capture system mounted on the worker's helmet. Because the spatial indexing system can automatically identify the positions at which each of the images is captured, the construction worker does not need to walk through the floor along a predetermined path; instead, the construction worker can simply walk through the floor along any arbitrary camera path, which allows the worker to walk around any obstructions that he encounters.

Continuing with the construction site example above, suppose a general contractor from a general contracting company wishes to record the progress of construction over the course of an 18-month project to build a residential high-rise building. Such progress records are useful, for example, in tracking subcontractor progress, resolving conflicts between plans and as-built construction, and as evidence in liability claims that may occur after a project is completed. Critically, the value of such progress records is entirely dependent upon the ability of end users within the general contracting company to efficiently find video/image data about specific locations within the construction site.

Conventionally, generating such progress records requires an employee or subcontractor of the general contracting company to walk through the construction site recording images (or video) and manually annotating the locations within the construction site that appear in each image. Such annotations enable efficient access to the images of specific locations within the construction site, but the time and cost associated with manually generating these annotations can be prohibitive, and these costs scale with the size of the site and the frequency of recording.

Using the methods and systems described herein, the spatial indexing system can automatically index the location of every captured image without having a user perform any manual annotation and without having to rely solely on GPS or RF signals, which can be absent, blocked, or significantly attenuated in an indoor environment such as a construction site. This reduces the amount of user input associated with capturing the images, which allows the process to be completed faster and more efficiently.

After indexing the location of every captured image, the spatial indexing system can generate an immersive model of the environment. The immersive model includes a set of images extracted from the sequence of captured images and specifies a location on the floorplan for each of the extracted images. The immersive model can also include one or more route vectors for each extracted image. A route vector for an extracted image specifies a spatial distance (i.e., a direction and a magnitude) between the extracted image and one of the other extracted images. When displaying one of the extracted images in the visualization interface, the spatial indexing system can display waypoint icons within the extracted image at the positions defined by each of the route vectors. The user can then select one of these waypoint icons to view the extracted image that was captured at that position.

Although the drawings and written description provide examples with respect to a construction site, the methods and systems described herein can also be used to in other types of environments, such as an interior area of a completed building, an interior area of some other type of structure (such as a ship), or an outdoor area (such as a garden or yard). In addition to the construction site example described herein, the captured images and the resulting immersive model can also be used in a variety of other contexts. For instance, a security guard can use the methods and systems described herein to record the state of a facility at each checkpoint along a route. As another example, a facilities manager can capture photo documentation of the inventory in a warehouse. As still another example, a realtor can capture photos to create a virtual tour of a house.

II. System Environment

FIG. 1 illustrates a system environment 100 for identifying spatial locations at which images in a sequence were captured, according to one embodiment. In the embodiment shown in FIG. 1, the system environment 100 includes an image capture system 110, a network 120, a spatial indexing system 130, and a client device 150. Although a single image capture system 110 and a single client device 150 are shown in FIG. 1, in some implementations the spatial indexing system interacts with multiple image capture systems 110 or multiple client devices 150 at once.

The image capture system 110 collects image data, motion data, and location data as the system 110 is moved along a camera path. In the embodiment shown in FIG. 1, the image capture system includes a 360-degree camera 112, motion sensors 114, and location sensors 116. The image capture system 110 is implemented as a device with a form factor that is suitable for being moved along the camera path. In one embodiment, the image capture system 110 is a portable device that a user physically moves along the camera path, such as a wheeled cart or a device that is mounted on or integrated into an object that is worn on the user's body (e.g., a backpack or hardhat). In another embodiment, the image capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human operator in real-time.

The 360-degree camera 112 collects image data by capturing a sequence of 360-degree images as the image capture system 110 is moved along the camera path. As referred to herein, a 360-degree image is an image having a field of view that covers a 360-degree field of view. The 360-degree camera 112 can be implemented by arranging multiple cameras in the image capture system 110 so that they are pointed at varying angles relative to each other, and configuring the cameras to capture images of the environment from their respective angles at approximately the same time. The images can then be combined to form a single 360-degree image. For example, the 360-degree camera 112 can be implemented by capturing images at substantially the same time from two 180° panoramic cameras that are pointed in opposite directions. As used herein, images are captured at substantially the same time if they are captured within a threshold time interval of each other (e.g., within 1 second, within 100 milliseconds, etc.).

In one embodiment, the 360-degree camera 112 captures a 360-degree video, and the images in the sequences of images are the frames of the video. In another embodiment, the 360-degree camera 112 captures a sequence of still images separated by fixed time intervals. The sequence of images can be captured at any frame rate, such as a high frame rate (e.g., 60 frames per second) or a low frame rate (e.g., 1 frame per second). In general, capturing the sequence of images at a higher frame rate produces more robust results, while capturing the sequence of images at a lower frame rate allows for reduced data storage and transmission.

The motion sensors 114 and location sensors 116 collect motion data and location data, respectively, while the 360-degree camera 112 is capturing the image data. The motion sensors 114 can include, for example, an accelerometer and a gyroscope. The motion sensors 114 can also include a magnetometer that measures a direction of a magnetic field surrounding the image capture system 110.

The location sensors 116 can include a receiver for a global navigation satellite system (e.g., a GPS receiver) that determines the latitude and longitude coordinates of the image capture system 110. In some embodiments, the location sensors 116 additionally or alternatively include a receiver for an indoor positioning system (IPS) that determines the position of the image capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the image capture system 110 shown in FIG. 1 includes a 360-degree camera 112, motion sensors 114, and location sensors 116, some of the components 112, 114, 116 may be omitted from the image capture system 110 in other embodiments. For instance, one or both of the motion sensors 114 and the location sensors 116 may be omitted from the image capture system. In addition, although the image capture system 110 is described in FIG. 1 with a 360-degree camera 112, the image capture system 110 may alternatively include a camera with a narrow field of view.

In some embodiments, the image capture system 110 is implemented as part of a computing device (e.g., the computer system 700 shown in FIG. 7) that also includes a storage device to store the captured data and a communication interface that sends the captured data over the network 120 to the spatial indexing system 130. In one embodiment, the image capture system 110 stores the captured data locally as the system 110 is moved along the camera path, and the data is sent to the spatial indexing system 130 after the data collection has been completed. In another embodiment, the image capture system 110 sends the captured data to the spatial indexing system 130 in real-time as the system 110 is being moved along the camera path.

The image capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The spatial indexing system 130 receives the images and the other data collected by the image capture system 110, performs a spatial indexing process to automatically identify the spatial locations at which each of the images were captured, builds a model of the environment, and provides a visualization interface that allows the client device 150 to view the captured images at their respective locations within the model. In the embodiment shown in FIG. 1, the spatial indexing system 130 includes a camera path module 132, camera path storage 134, floorplan storage 136, a model generation module 138, model storage 140, and a model visualization module 142.

The camera path module 132 receives the images and the other data that were collected by the image capture system 110 as the system 110 was moved along the camera path and determines the camera path based on the received images and data. In one embodiment, the camera path is defined as a 6D camera pose for each image in the sequence of images. The 6D camera pose for each image is an estimate of the relative position and orientation of the 360-degree camera 112 when the image was captured. The camera path module 132 can store the camera path in the camera path storage 134.

In one embodiment, the camera path module 132 uses a SLAM (simultaneous localization and mapping) algorithm to simultaneously (1) determine an estimate of the camera path by inferring the location and orientation of the 360-degree camera 112 and (2) model the environment using direct methods or using landmark features (such as oriented FAST and rotated BRIEF (ORB), scale-invariant feature transform (SIFT), speeded up robust features (SURF), etc.) extracted from the sequence of images. The camera path module 132 outputs a vector of six dimensional (6D) camera poses over time, with one 6D vector (three dimensions for location, three dimensions for orientation) for each image in the sequence, and the 6D vector can be stored in the camera path storage 134. An embodiment of the camera path module 132 is described in detail below with respect to FIG. 2A.

The spatial indexing system 130 can also include floorplan storage 136, which stores one or more floorplans, such as those of environments captured by the image capture system 110. As referred to herein, a floorplan is a to-scale, two-dimensional (2D) diagrammatic representation of an environment (e.g., a portion of a building or structure) from a top-down perspective. The floorplan specifies the positions and dimensions of physical features in the environment, such as doors, windows, walls, and stairs. The different portions of a building or structure may be represented by separate floorplans. For example, in the construction example described above, the spatial indexing system 130 may store separate floorplans for each floor, unit, or substructure.

The model generation module 136 generates an immersive model of the environment. As referred to herein, the immersive model is a representation of the environment that comprises a set of extracted images of the environment, the relative positions of each of the images (as indicated by the image's 6D pose), and (optionally) the absolute position of each of the images on a floorplan of the environment. In one embodiment, the model generation module 136 receives an image sequence and its corresponding camera path (e.g., a 6D pose vector specifying a 6D pose for each image in the sequence of images) from the camera path module 132 or the camera path storage 134 and extracts a subset of the images in the sequence and their corresponding 6D poses for inclusion in the model. For example, if the sequence of images are frames in a video that was captured at 30 frames per second, the model generation module 136 subsamples the images by extracting images and their corresponding 6D poses at 0.5-second intervals. After generating the model, the model generation module 136 can store the model in the model storage 140. An embodiment of the model generation module 136 is described in detail below with respect to FIG. 2B.

The model visualization module 142 provides a visualization interface to the client device 150. The visualization interface allows the user to view the immersive model in two ways. First, the visualization interface provides a 2D overhead map interface based on the output of the model generation module 138. The 2D overhead map is an interactive interface in which each relative camera location indicated on the 2D map is interactive, such that clicking on a point on the map navigates to the extracted image that was captured at that point in space. Second, the visualization interface provides a first-person view of an extracted 360-degree image that allows the user to pan and zoom around the image and to navigate to other images by selecting waypoint icons within the image that represent the relative locations of the other images. The visualization interface provides the first-person view of an image after the user selects the image in the 2D overhead map or in the first-person view of a different image. Example screenshots of the visualization interface are shown in FIGS. 3A-3D.

The client device 150 is a computing device, such as a smartphone, tablet computer, laptop computer, or desktop computer that displays, on a display device such as a screen, the visualization interface to a user and receives user inputs to interact with the visualization interface. An example implementation of the client device 150 is described below with reference to the computer system 700 in FIG. 7.

Figure 2A:
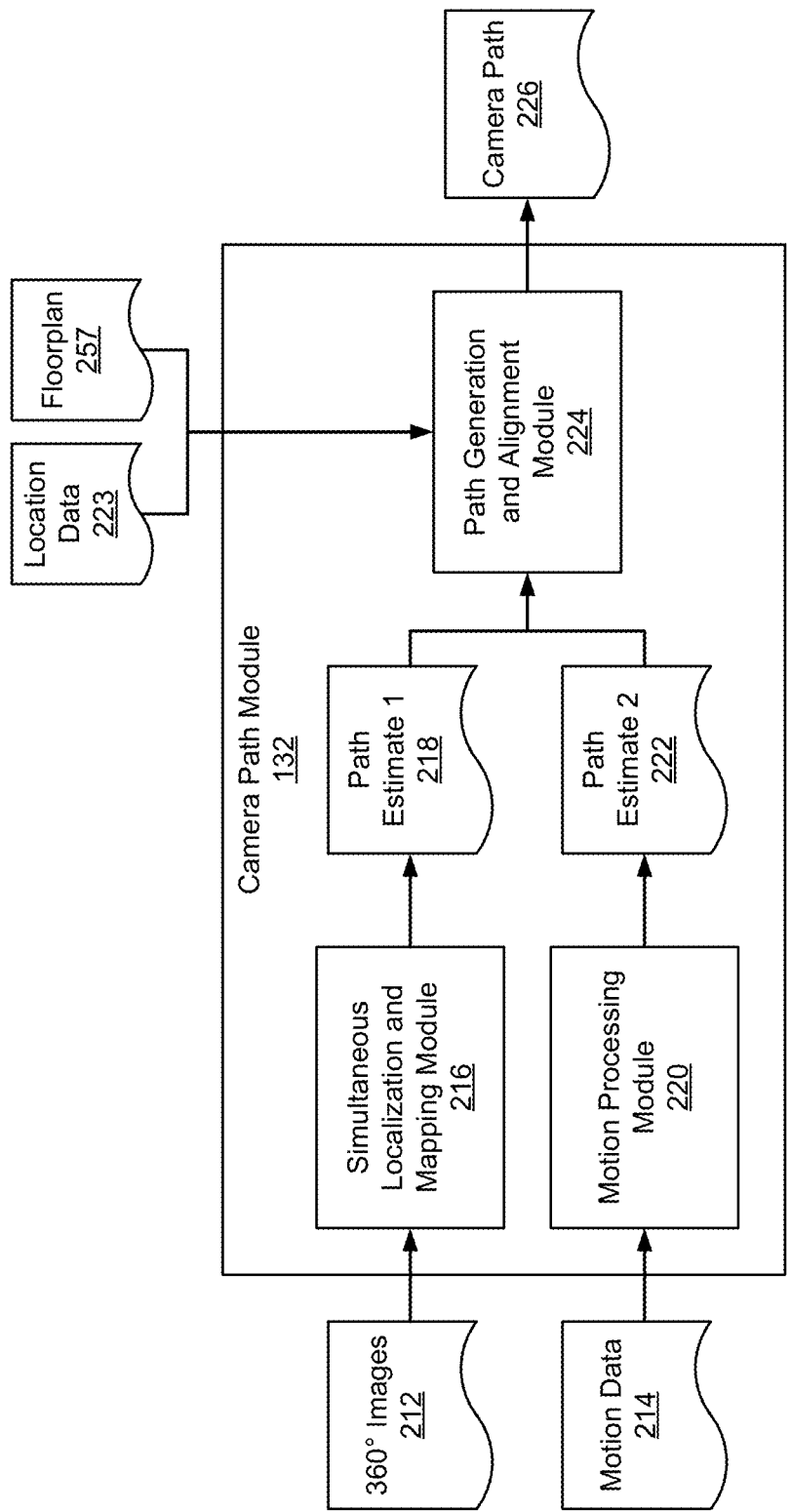
FIG. 2A illustrates a block diagram of a camera path module, according to one embodiment.

FIG. 2A illustrates a block diagram of the camera path module 132 of the spatial indexing system 130 shown in FIG. 1, according to one embodiment. The camera path module 132 receives input data (e.g., a sequence of 360-degree images 212, motion data 214, and location data 223) captured by the image capture system 110 and generates a camera path 226. In the embodiment shown in FIG. 2A, the camera path module 132 includes a simultaneous localization and mapping (SLAM) module 216, a motion processing module 220, and a path generation and alignment module 224.

The SLAM module 216 receives the sequence of 360-degree images 212 and performs a SLAM algorithm to generate a first estimate 218 of the camera path. Before performing the SLAM algorithm, the SLAM module 216 can perform one or more preprocessing steps on the images 212. In one embodiment, the pre-processing steps include extracting features from the images 212 by converting the sequence of 360-degree images 212 into a sequence of vectors, where each vector is a feature representation of a respective image. In particular, the SLAM module can extract SIFT features, SURF features, or ORB features.

After extracting the features, the pre-processing steps can also include a segmentation process. The segmentation process divides the sequence of images into segments based on the quality of the features in each of the images. In one embodiment, the feature quality in an image is defined as the number of features that were extracted from the image. In this embodiment, the segmentation step classifies each image as having high feature quality or low feature quality based on whether the feature quality of the image is above or below a threshold value, respectively (i.e., images having a feature quality above the threshold are classified as high quality, and images having a feature quality below the threshold are classified as low quality). Low feature quality can be caused by, e.g., excess motion blur or low lighting conditions.

After classifying the images, the segmentation process splits the sequence so that consecutive images with high feature quality are joined into segments and images with low feature quality are not included in any of the segments. For example, suppose the camera path travels into and out of a series of well-lit rooms along a poorly-lit hallway. In this example, the images captured in each room are likely to have high feature quality, while the images captured in the hallway are likely to have low feature quality. As a result, the segmentation process divides the sequence of images so that the each sequence of consecutive images captured in the same room is split into a single segment (resulting in a separate segment for each room), while the images captured in the hallway are not included in any of the segments.

After the pre-processing steps, the SLAM module 216 performs a SLAM algorithm to generate a first estimate 218 of the camera path. In one embodiment, the first estimate 218 is also a vector of 6D camera poses over time, with one 6D vector for each image in the sequence. In an embodiment where the pre-processing steps include segmenting the sequence of images, the SLAM algorithm is performed separately on each of the segments to generate a camera path segment for each segment of images.

The motion processing module 220 receives the motion data 214 that was collected as the image capture system 110 was moved along the camera path and generates a second estimate 222 of the camera path. Similar to the first estimate 218 of the camera path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the image capture system 110.

The data generated by many consumer-grade gyroscopes includes a time-varying bias (also referred to as drift) that can impact the accuracy of the second estimate 222 of the camera path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the image capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the camera path into a combined estimate of the camera path 226. In an embodiment where the image capture system 110 also collects location data 223 while being moved along the camera path, the path generation module 224 can also use the location data 223 when generating the camera path 226. If a floorplan of the environment is available, the path generation and alignment module 224 can also receive the floorplan 257 as input and align the combined estimate of the camera path 216 to the floorplan 257. Example techniques for combining the first estimate 218 and the second estimate 222 and aligning the camera path to a floorplan are described below with respect to FIGS. 4, 5, and 6.

Figure 2B:
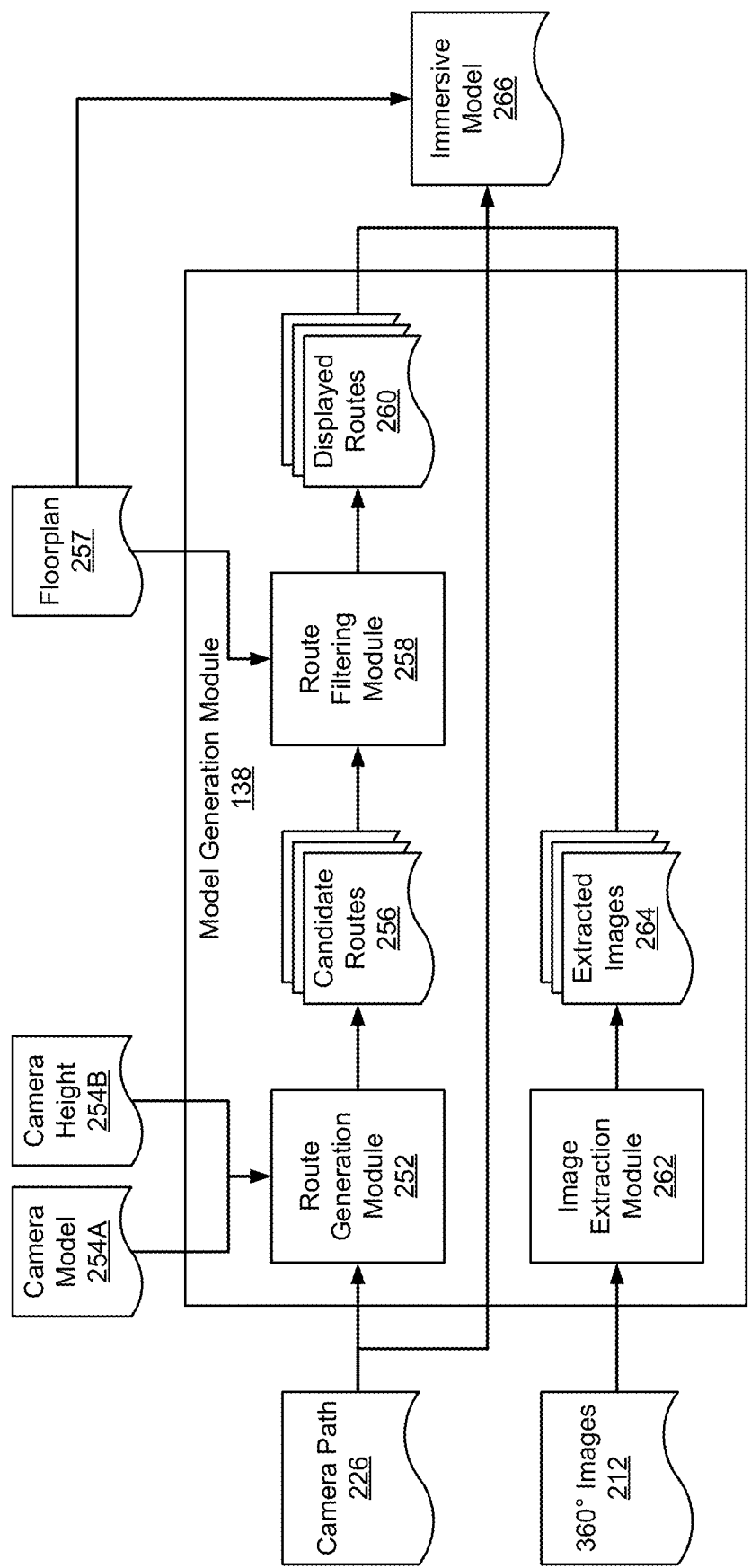
FIG. 2B illustrates a block diagram of a model generation module, according to one embodiment.

FIG. 2B illustrates a block diagram of the model generation module 138 of the spatial indexing system 130 shown in FIG. 1, according to one embodiment. The model generation module 138 receives the camera path 226 generated by the camera path module 132, along with the sequence of 360 degree images 212 that were captured by the image capture system 130, a floorplan 257 of the environment, and information about the camera 254. The output of the model generation module 138 is an immersive model 266 of the environment. In the illustrated embodiment, the model generation module 138 includes a route generation module 252, a route filtering module 258, and an image extraction module 262.

The route generation module 252 receives the camera path 226 and camera information 254 and generates one or more candidate route vectors 256 for each extracted image. The camera information 254 includes a camera model 254A and camera height 254B. The camera model 254A is a model that maps each 2D point in a 360-degree image (i.e., as defined by a pair of coordinates identifying a pixel within the image) to a 3D ray that represents the direction of the line of sight from the camera to that 2D point. In one embodiment, the spatial indexing system 130 stores a separate camera model for each type of camera supported by the system 130. The camera height 254B is the height of the camera relative to the floor of the environment while the sequence of images is being captured. In one embodiment, the camera height is assumed to have a constant value during the image capture process. For instance, if the camera is mounted on a hardhat that is worn on a user's body, then the height has a constant value equal to the sum of the user's height and the height of the camera relative to the top of the user's head (both quantities can be received as user input).

As referred to herein, a route vector for an extracted image is a vector representing a spatial distance between the extracted image and one of the other extracted images. For instance, the route vector associated with an extracted image has its tail at that extracted image and its head at the other extracted image, such that adding the route vector to the spatial location of its associated image yields the spatial location of the other extracted image. In one embodiment, the route vector is computed by performing vector subtraction to calculate a difference between the three-dimensional locations of the two extracted images, as indicated by their respective 6D pose vectors.

Referring back to the model visualization module 142, the route vectors for an extracted image are later used after the model visualization module 142 receives the immersive model 266 and displays a first-person view of the extracted image. When displaying the first-person view, the model visualization module 142 renders a waypoint icon (shown in FIG. 3B as a blue circle) at a position in the image that represents the position of the other image (e.g., the image at the head of the route vector). In one embodiment, the model visualization module 140 uses the following equation to determine the position within the image at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the camera projection function used for rendering, $M_{view}$ is an isometry matrix representing the user's position and orientation relative to his or her current image, $M_{delta}$ is the route vector, $G_{ring}$ is the geometry (a list of 3D coordinates) representing a mesh model of the waypoint icon being rendered, and $P_{icon}$ is the geometry of the icon within the first-person view of the image.

Referring again to the route generation module 138, the route generation module 252 can compute a candidate route vector 256 between each pair of extracted images. However, displaying a separate waypoint icon for each candidate route vector associated with an image can result in a large number of waypoint icons (e.g., several dozen) being displayed in an image, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the image. This can be done, for example, by extracting an image patch of the floorplan from the region of the floorplan surrounding a candidate route vector 256, and submitting the image patch to an image classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The image extraction module 262 receives the sequence of 360-degree images and extracts some or all of the images to generate extracted images 264. In one embodiment, the sequences of 360-degree images are captured as frames of a 360-degree video, and the image extraction module 262 generates a separate extracted image of each frame. As described above with respect to FIG. 1, the image extraction module 262 can also extract a subset of the sequence of images 212. For example, if the sequence of images 212 was captured at a relatively high framerate (e.g., 30 or 60 frames per second), the image extraction module 262 can extract a subset of the images at regular intervals (e.g., two images per second of video) so that a more manageable number of extracted images 264 are displayed to the user as part of the immersive model.

The floorplan 257, displayed route vectors 260, camera path 226, and extracted images 264 are combined into the immersive model 266. As noted above, the immersive model 266 is a representation of the environment that comprises a set of extracted images 264 of the environment, the relative positions of each of the images (as indicated by the 6D poses in the camera path 226). In the embodiment shown in FIG. 2B, the immersive model also includes the floorplan 257, the absolute positions of each of the images on the floorplan, and displayed route vectors 260 for some or all of the extracted images 264.

FIGS. 3A-3E are screenshots illustrating portions of the model visualization interface provided by the model visualization module, according to one embodiment. As described above in FIG. 1, the model visualization interface allows a user to view each of the captured images at its corresponding location within a virtual model of the environment.

Figure 3A:
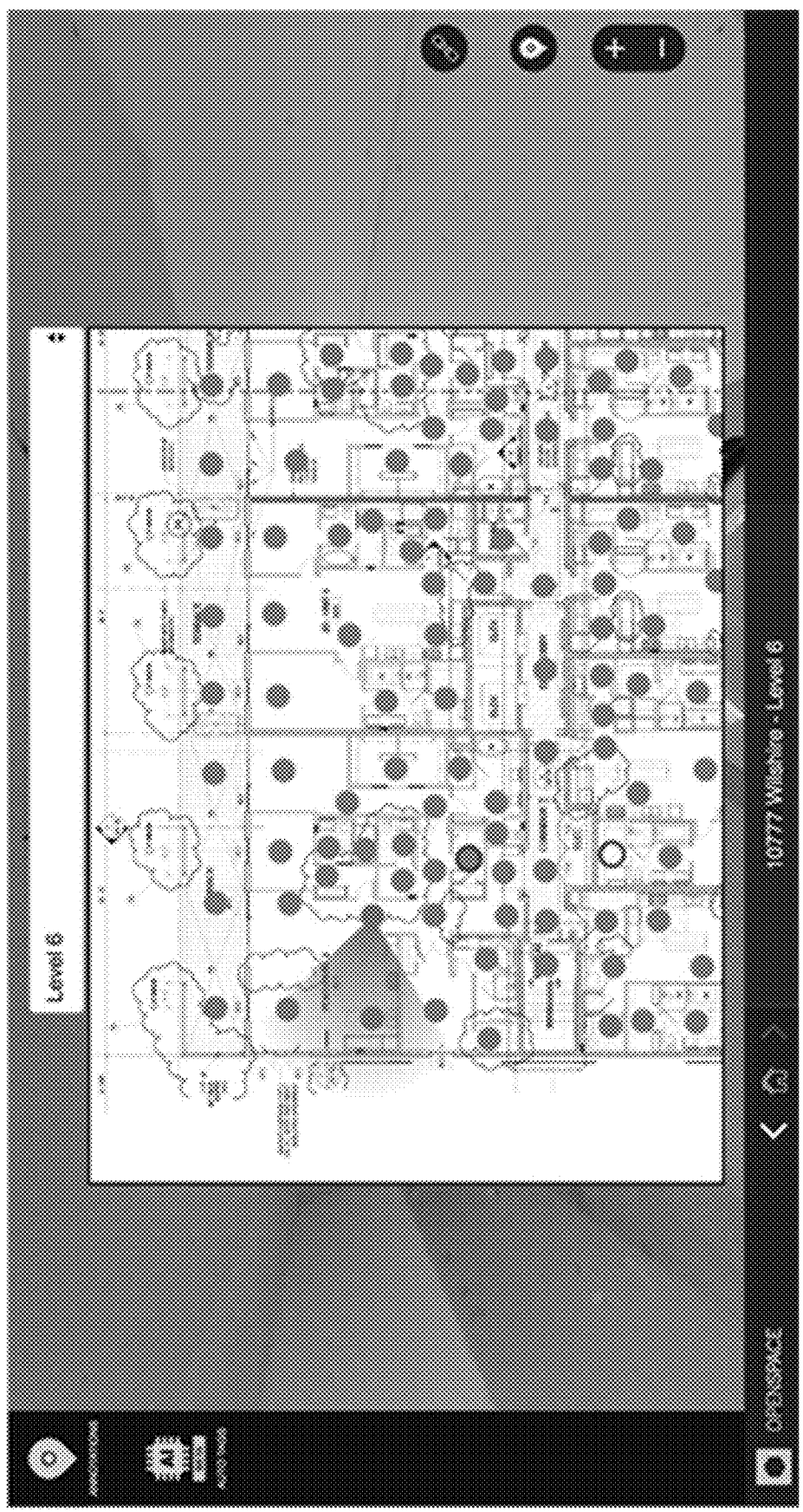
FIGS. 3A-3E are screenshots illustrating portions of the model visualization interface provided by the model visualization module, according to one embodiment.
Figure 3B:
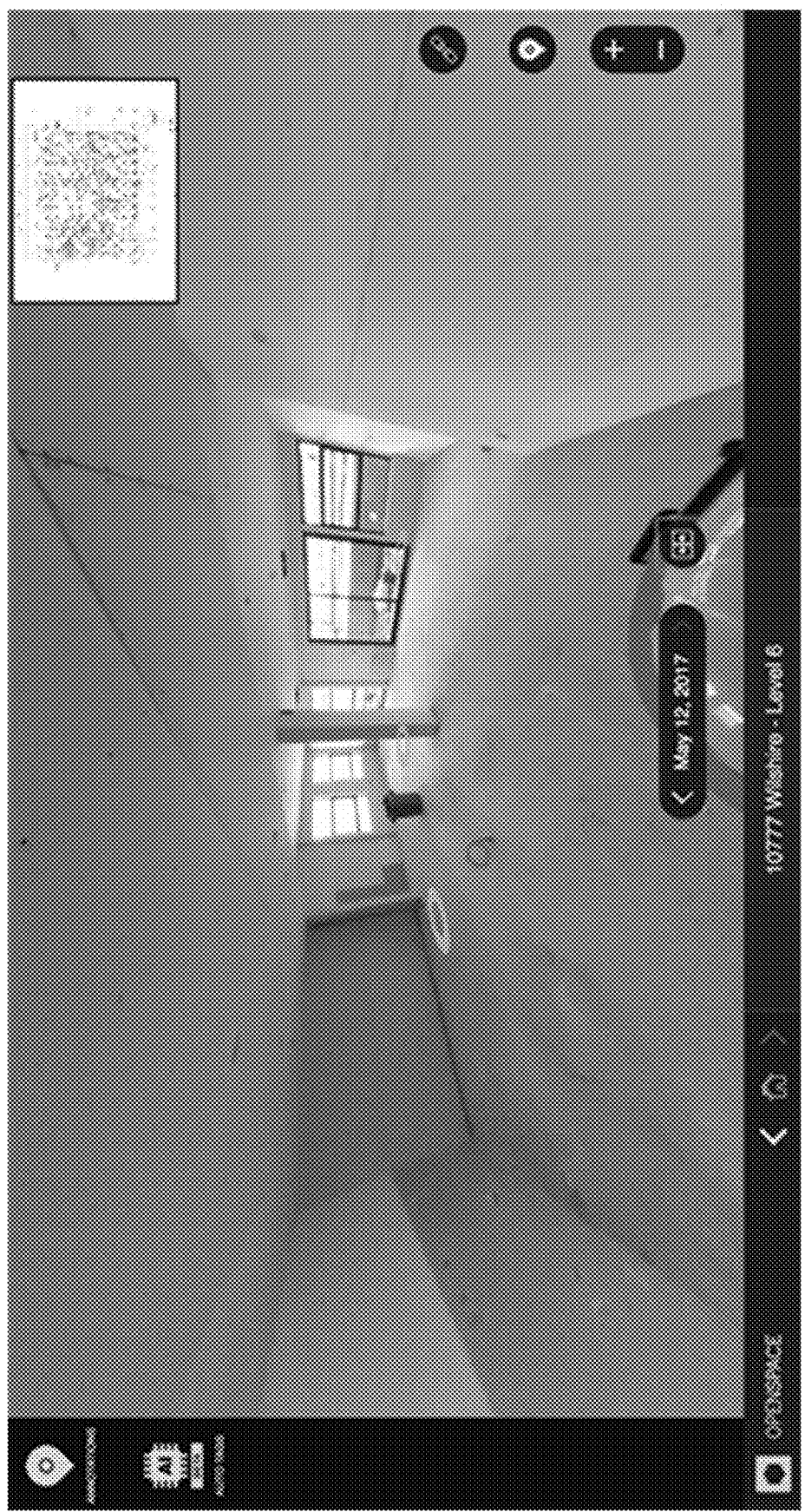

The screenshots shown in FIGS. 3A-3E continue with the general contracting company example from above. As framing is being completed on a construction site, the general contractor captures a sequence of images inside each unit to create a record of work that will soon be hidden by the installation of drywall. The captured images are provided as input to the camera path module 132, which generates a vector of 6D camera poses (one 6D pose for each image). The 6D camera poses are provided as input to the model visualization module, which provides a 2D representation of the relative camera locations associated with each image. The user can view this representation by using a client device 150 to view the visualization interface provided by the model visualization module 142, and the user can navigate to different images in the sequence by selecting icons on a 2D overhead view map. After the user has selected the icon for an image in the 2D overhead map, the visualization interface displays a first-person view of the image that the user can pan and zoom. The first-person view also includes waypoint icons representing the positions of other captured images, and the user can navigate to the first-person view of one of these other images by selecting the waypoint icon for the image. As described above with respect to FIG. 2B, each waypoint icon is rendered based on a route vector that points from the image being displayed to the other image. An example of the 2D overhead view map is shown in FIG. 3A, and an example of a first-person view is shown in FIG. 3B. In the first-person view shown in FIG. 3B, the waypoint icons are blue circles.

Figure 3C:

Referring back to the general contracting company example, two months after the images are recorded, a problem is discovered in one of the units that requires an examination of electrical work that is hidden inside one of the walls. Traditionally, examining this electrical work would require tearing down the drywall and other completed finishes in order to expose the work, which is a very costly exercise. However, the general contractor is instead able to access the visualization interface and use the 2D overhead map view to identify the location within the building where the problem was discovered. The general contractor can then click on that location to view an image taken at that location. In this example, the image shown in FIG. 3C is taken at the location where the problem was discovered.

In one embodiment, the visualization interface also includes a split-screen view that displays a first image on one side of the screen and a second image on the other side of the screen. This can be used, for example, to create a side-by-side view of two images that were captured at the same location at different times. These two views can also be synchronized so that adjusting the zoom/orientation in one view adjusts the zoom/orientation in the other view.

Figure 3D:
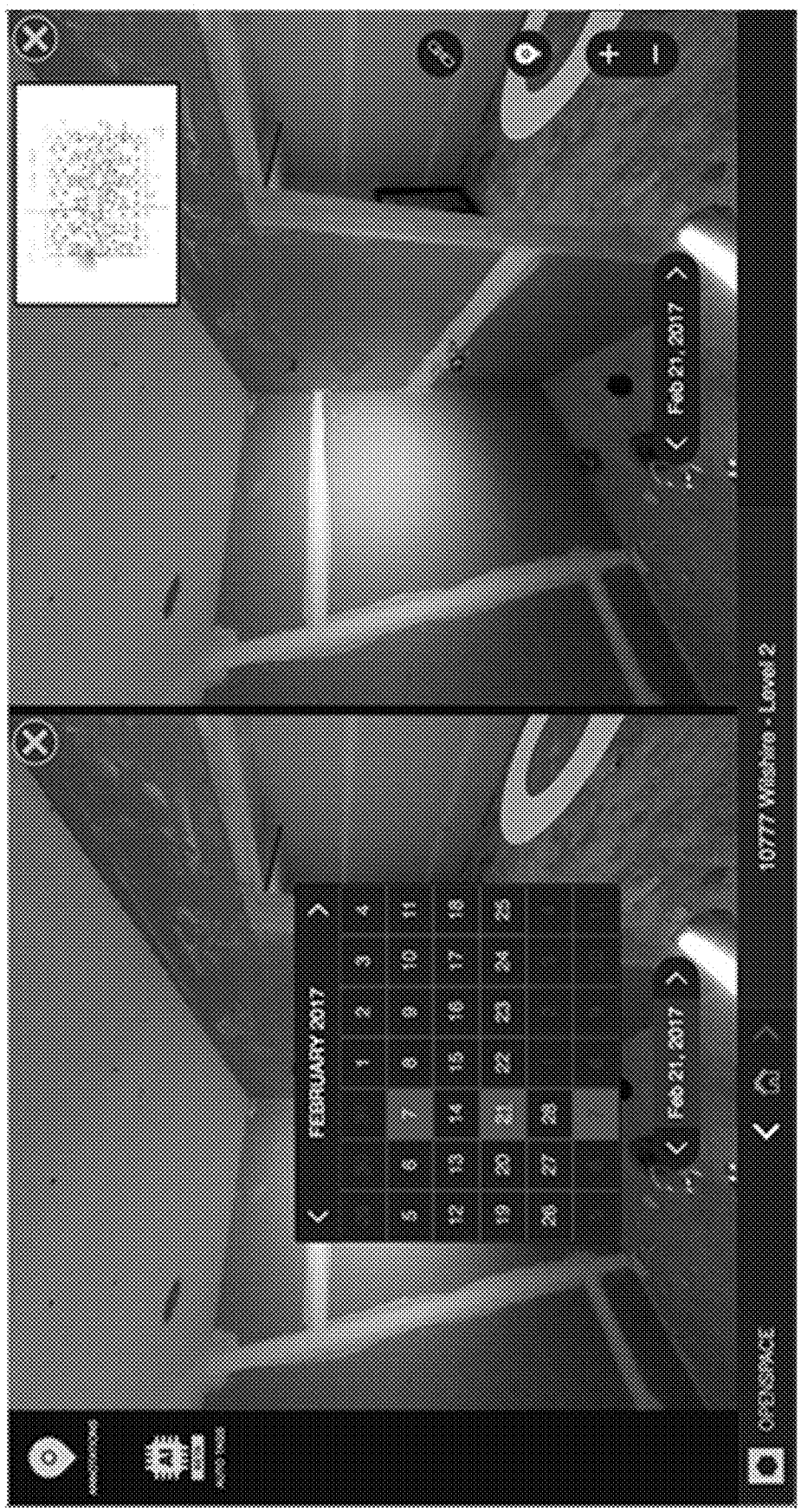
Figure 3E:
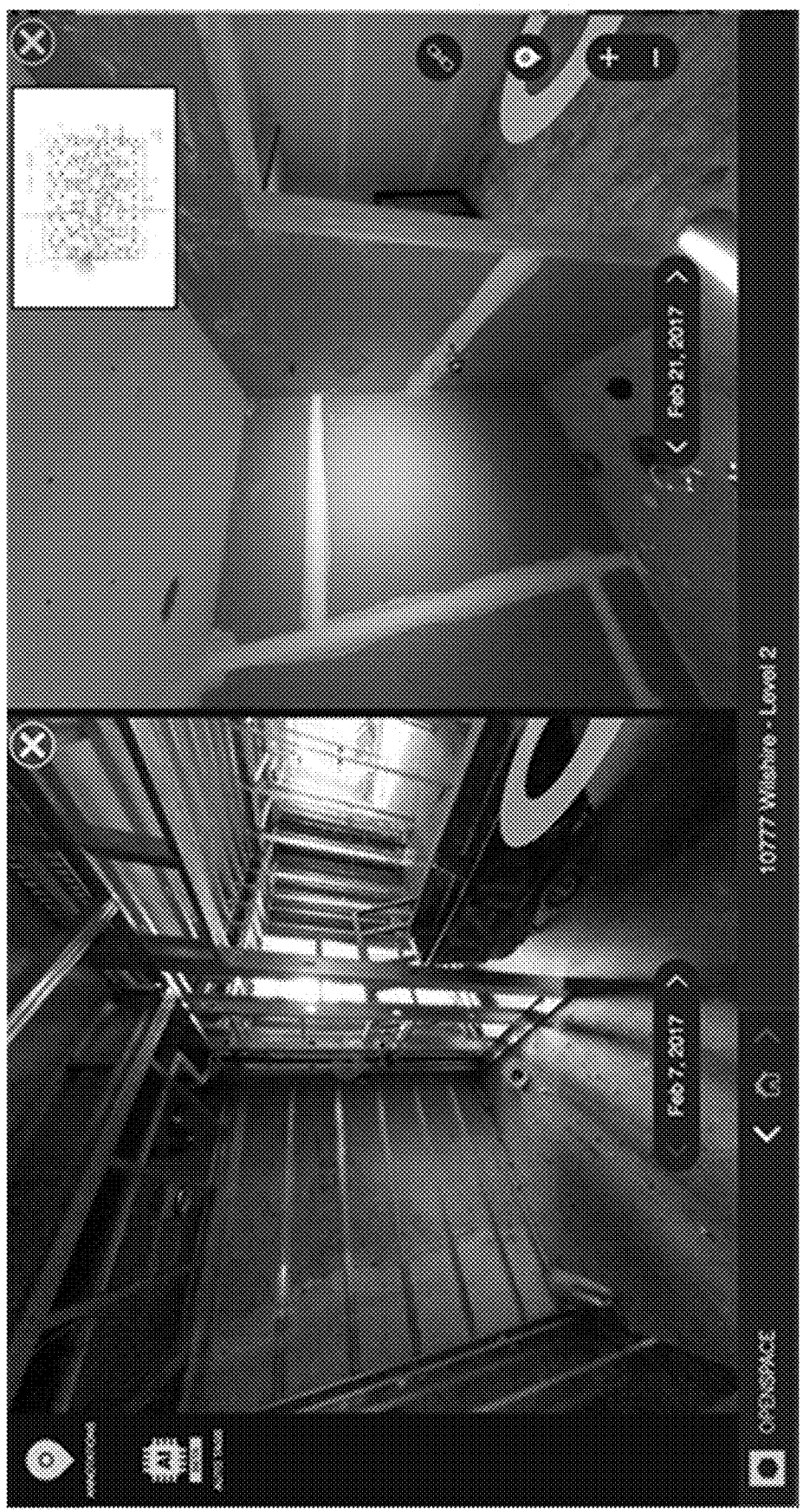

In the screenshots shown in FIGS. 3D and 3E, the general contractor has used the split-screen view to create a side-by-side view that displays an image from a day after drywall was installed on the right side and an image taken from an earlier date (e.g. the day before drywall was installed) on the left side. By using the visualization interface to "travel back in time" and view the electrical work before it was covered with the drywall, the general contractor can inspect the electrical issues while avoiding the need for costly removal of the drywall. Furthermore, because the spatial indexing system 130 can automatically index the location of every captured image without having a user perform any manual annotation, the process of capturing and indexing the images is less time consuming and can be performed on a regular basis, such as every day or several times per week.

III. Spatial Indexing of Images Based on Floorplan Features

As noted above, the visualization interface can provide a 2D overhead view map that displays the location of each image within a floorplan of the environment. In addition to being displayed in the overhead view, the floorplan of the environment can also be used as part of the spatial indexing process that determines the location of each image.

Figure 4:
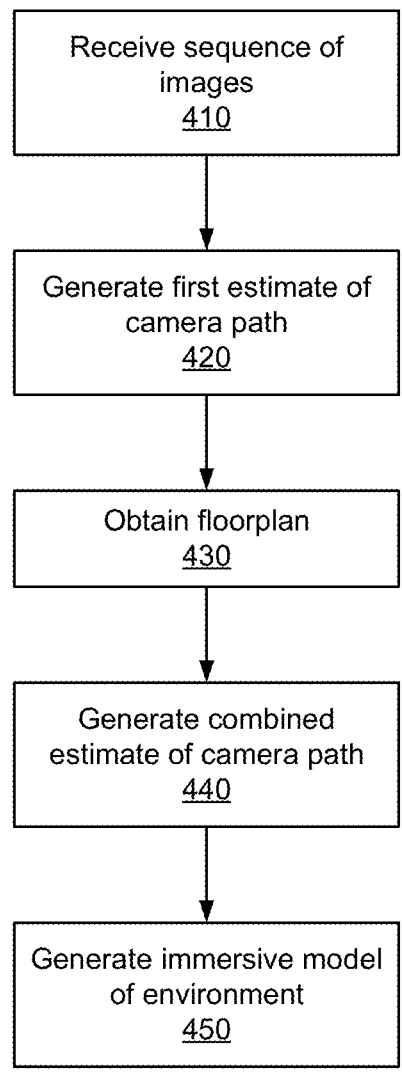
FIG. 4 is a flow chart illustrating an example method for automated spatial indexing of images using features in a floorplan, according to one embodiment.

FIG. 4 is a flow chart illustrating an example method 400 for automated spatial indexing of images using features in a floorplan, according to one embodiment. In other embodiments, the method 400 may include additional, fewer, or different steps, and the steps shown in FIG. 4 may be performed in a different order. For instance, the method 400 may be performed without obtaining 430 a floorplan, in which case the combined estimate of the camera path is generated 440 without using features in the floorplan.

The spatial indexing system 130 receives 410 a sequence of images from an image capture system 110. The images in the sequence are captured as the image capture system 110 is moved through an environment (e.g., a floor of a construction site) along a camera path. In one embodiment, each of the images is a 360-degree image that is captured by a 360-degree camera on the image capture system (e.g., the 360-degree camera 112 described above with respect to FIG. 1). In another embodiment, each of the images has a narrower field of view, such as 90 degrees.

The spatial indexing system 130 generates 420 a first estimate of the camera path based on the sequence of images. The first estimate of the camera path can be represented, for example, as a six-dimensional vector that specifies a 6D camera pose for each image in the sequence. In one embodiment, a component of the spatial indexing system 130 (e.g., the SLAM module 216 described above with reference to FIG. 2A) performs a SLAM algorithm on the sequence of images to simultaneously determine a 6D camera pose for each image and generate a three-dimensional virtual model of the environment.

The spatial indexing system 130 obtains 430 a floorplan of the environment. For example, multiple floorplans (including the floorplan for the environment that is depicted in the received sequence of images) may be stored in the floorplan storage 136, and the spatial indexing system 130 accesses the floorplan storage 136 to obtain the floorplan of the environment. The floorplan of the environment may also be received from a user via the image capture system 110 or a client device 150 without being stored in the floorplan storage 136.

The spatial indexing system 130 generates 440 a combined estimate of the camera path based on the first estimate of the camera path and the physical features in the floorplan. Two example methods 500, 600 of generating the combined estimate of the camera path 440 are described below with respect to FIGS. 5 and 6, respectively.

After generating 440 the combined estimate of the camera path, the spatial indexing system 130 generates 450 an immersive model of the environment. For example, the model generation module 138 generates the immersive model by combining the floorplan, a plurality of route vectors, the combined estimate of the camera path, and extracted images from the sequence of images, as described above with respect to FIG. 2B.

In some embodiments, the spatial indexing system 130 may also receive additional data (apart from the sequence of images) that was captured while the image capture system is being moved along the camera path. For example, the spatial indexing system also receives motion data or location data as described above with reference to FIG. 1. In embodiments where the spatial indexing system 130 receives additional data, the spatial indexing system 130 may use the additional data in addition with the floorplan when generating 440 the combined estimate of the camera path.

In an embodiment where the spatial indexing system 130 receives motion data along with the sequence of images, the spatial indexing system 130 can perform a dead reckoning process on the motion data to generate a second estimate of the camera path, as described above with respect to FIG. 2A. In this embodiment, the step of generating 440 the combined estimate of the camera path includes using portions of the second estimate to fill in gaps in the first estimate of the camera path. For example, the first estimate of the camera path may be divided into camera path segments due to poor feature quality in some of the captured images (which causes gaps where the SLAM algorithm cannot generate a reliable 6D pose, as described above with respect to FIG. 2A). In this case, 6D poses from the second path estimate can be used to join the segments of the first path estimate by filling in the gaps between the segments of the first path estimate.

As noted above, in some embodiments the method 400 may be performed without obtaining 430 a floorplan and the combined estimate of the camera path is generated 440 without using features in the floorplan. In one of these embodiments, the first estimate of the camera path is used as the combined estimate of the camera path without any additional data processing or analysis.

In another one of these embodiments, the combined estimate of the camera path is generated 440 by generating one or more additional estimates of the camera path, calculating a confidence score for each 6D pose in each path estimate, and selecting, for each spatial position along the camera path, the 6D pose with the highest confidence score. For instance, the additional estimates of the camera path may include one or more of: a second estimate using motion data, as described above, a third estimate using data from a GPS receiver, and a fourth estimate using data from an IPS receiver. As described above, each estimate of the camera path is a vector of 6D poses that describe the relative position and orientation for each image in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the image corresponding to the 6D pose (e.g., the number of detected features in the image); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the camera path and selects, for each image in the sequence, the 6D pose having the highest confidence score, and the selected 6D pose is output as the 6D pose for the image in the combined estimate of the camera path. Because the confidence scores for each path estimate are calculated differently, the confidence scores for each path estimate can be normalized to a common scale (e.g., a scalar value between 0 and 1, with 0 representing the lowest possible confidence and 1 representing the highest possible confidence) before the iterative scanning process takes place.

IV. Floor Plan Alignment with Brute Force Search

Figure 5:
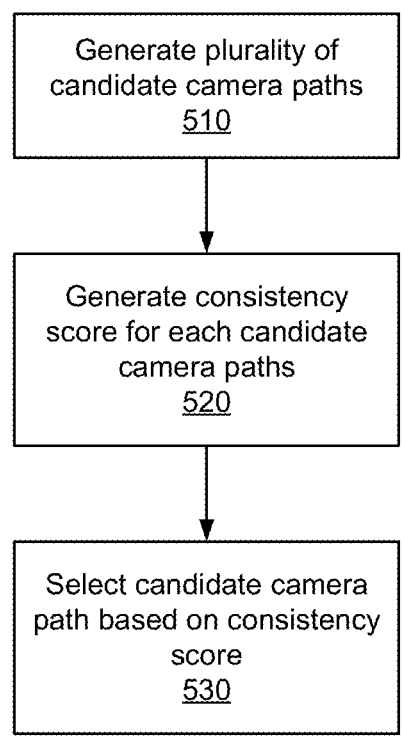
FIG. 5 is a flow chart illustrating an example method for aligning a camera path with a floorplan using a brute force search, according to one embodiment.

FIG. 5 is a flow chart illustrating a method 500 for generating a combined camera path with a floorplan using a brute force search, according to one embodiment. In other embodiments, the method 500 may include additional, fewer, or different steps, and the steps shown in FIG. 5 may be performed in a different order.

The brute force search described in FIG. 5 aligns an estimate of the camera path with a floorplan by generating multiple candidate camera paths (e.g., by applying different scaling, rotation, and translation operations on the camera path estimate) and selecting the candidate camera path that has the highest consistency score relative to the features on the floorplan. As noted above, in some embodiments the first estimate of the camera path can be divided into a plurality of camera path segments (e.g., due to poor feature quality in some of the captured images). In these embodiments, the brute force search can be performed separately for each of the camera path segments to align each camera path segment with the floorplan. After aligning each of the camera path segments with the floorplan, the spatial indexing system can then use other data, such as motion data, to fill in the gaps in the camera path between the aligned camera path segments. The combination of the aligned camera paths and the filled-in gaps is then output as the combined camera path.

For ease of description, the brute force search is described below with respect to a camera path segment. However, the brute force search can also performed on the entirety of the first path estimate. For example, in some embodiments the first estimate of the camera path is not divided into segments (e.g., because each image in the sequence of 360-degree images includes features of sufficiently high quality). In these embodiments, the brute force search described in FIG. 5 is performed on the entirety of the first path estimate to align the first path estimate with the floorplan. In these embodiments, the result of the brute force search is output as the combined path estimate.

Referring now to FIG. 5, the spatial indexing system 130 generates 510 a plurality of candidate camera paths by applying a variety of transformations such as scaling, rotation, and translation operations to the camera path segment.

The spatial indexing system 130 compares each candidate camera path to the features in the floorplan and generates a consistency score for each of the candidate camera paths. The consistency score for a candidate camera path represents the degree of consistency between the candidate camera path and the floorplan.

In one embodiment, the consistency score is a weighted sum of four components. The first component represents the level of similarity between the candidate camera path and the features in the floorplan. For example, the first component can be calculated by generating an intersect score for each instance the candidate camera path intersects a feature in the floorplan, and then combining the intersect scores (e.g., by adding them together). The intersect score represents the likelihood of the real-world camera path passing through the type of feature being intersected (e.g., a high intersect score is generated for intersecting a door, while a low intersect score is generated for intersecting a wall).

The second and third components are based on location data received from the image capture system 110. The second component represents a degree of consistency between the candidate camera path and data from a GPS receiver on the image capture system. For instance, the second component is calculated by combining the distances between a location implied by the candidate camera path and a location specified by the location data at the same point in time. Meanwhile, the third component represents a degree of similarity between the candidate camera path and data from an IPS receiver on the image capture system 110. The third component can be computed in the same manner as the second component. In embodiments where the spatial indexing system 130 does not receive location data from the image capture system 110 (or only receives one type of location data), one or both of these components can be omitted from the consistency score.

The fourth component is generated by comparing features in the captured sequence of images with features from images that were previously captured at the same location on the floorplan. In an embodiment where the consistency score includes the fourth component, the spatial indexing system 130 stores previously-captured images in association with their floorplan locations (e.g., as part of one of the models in the model storage 140).

After generating the consistency scores for the candidate camera paths, the spatial indexing system 530 selects one candidate camera path based on the consistency scores. For example, the spatial indexing system 530 selects the candidate camera path with the highest consistency score.

V. Floor Plan Alignment with Grid Map

Figure 6A:
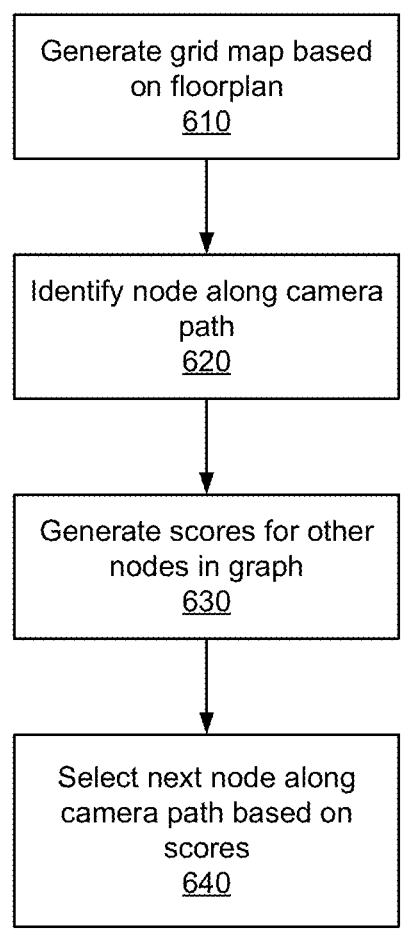
FIG. 6A is a flow chart illustrating an example method for aligning a camera path with a floorplan using a grid map of a floorplan, according to one embodiment.

FIG. 6A is a flow chart illustrating an example method 600 for generating a combined camera path using a grid map of a floorplan, according to one embodiment. In other embodiments, the method 600 may include additional, fewer, or different steps, and the steps shown in FIG. 6A may be performed in a different order.

The spatial indexing system 130 generates 610 a grid map based on the floorplan. The grid map is a graph in which each node represents a spatial position on the floorplan, and each edge between two nodes specifies a transition score that represents the traversability of the space between the two nodes. The transition score for an edge is determined based on the presence of features between the two nodes. For example, if a wall is present between the two nodes, then the transition score for the edges between those two nodes is lower to indicate that the camera path is unlikely to cross between the two nodes. In contrast, if a door is present between two nodes, then the transition score for the edge between the two nodes is higher.

In one embodiment, the weights for edges that pass through walls are adjusted over time. For example, at a first time (e.g., at an early stage in construction when the framing for the walls is not yet in place), the weights for these edges are assigned the same value as the weights for edges that pass through empty space inside a room. At a second time (e.g., at an intermediate stage in construction when the framing has been constructed, but the drywall is not yet in place), the weights for these edges are assigned a reduced value to indicate that physically passing through the wall is possible but not common. At a third time (e.g., at a later stage in construction when both the framing and the drywall are in place), the weights for these edges are assigned a low value to indicate that passing through the wall is physically impossible. The times corresponding to the first time, the second time, and the third time may be received as user input from a client device 150, determined based on a construction schedule provided to the spatial indexing system 130, or by performing feature recognition on some or all of the images in the sequence to determine the construction progress on the walls.

In one embodiment, the presence of a floorplan feature (such as a wall or a door) between two nodes is detected using a computer vision feature classifier. In this embodiment, the feature classifier extracts image features (e.g., SIFT SURG, or ORB features) from an image of the floorplan and uses the image features to classify different features (e.g., walls and doors) that appear at various positions in the floorplan. The feature classifier can be trained, for example, using training data that includes a plurality of manually annotated floorplans. In other embodiments, the presence of a feature between two nodes can be detected manually (e.g., by user input) or by using metadata within the floorplan.

Figure 6B:
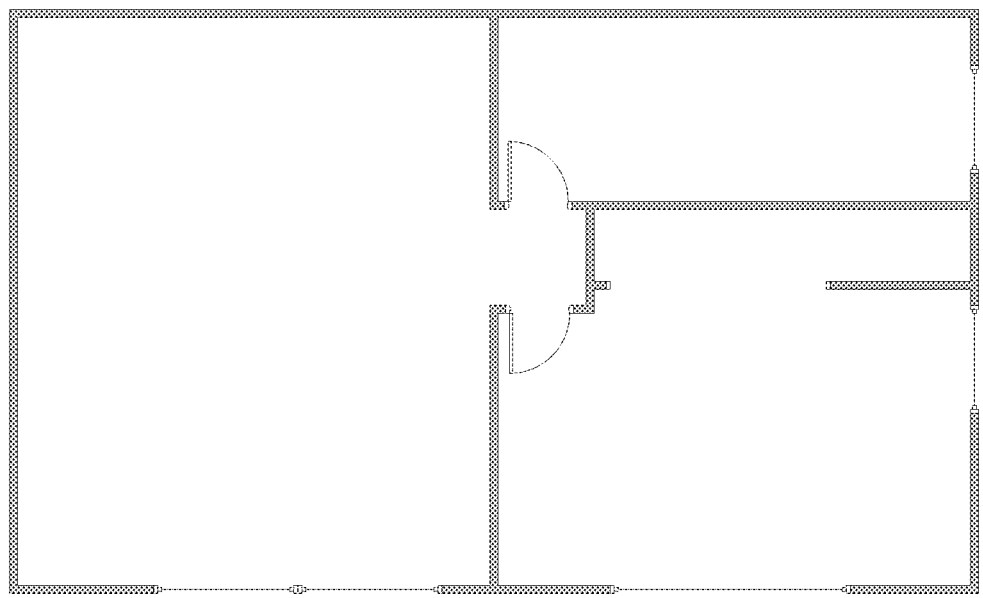
FIG. 6B illustrates an example of a floorplan, according to one embodiment.
Figure 6C:
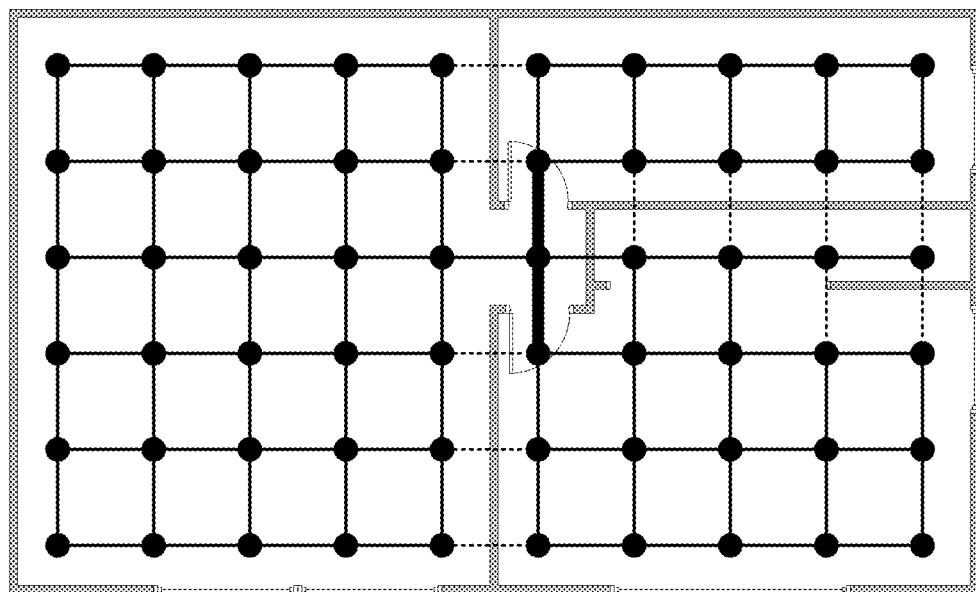
FIG. 6C illustrates an example of a grip map, according to one embodiment.

FIG. 6B illustrates an example of a floorplan, and FIG. 6C illustrates an example of a grip map that is generated for the floorplan. In the example grid map shown in FIG. 6C, the nodes are equally spaced in both the horizontal and vertical directions so that the nodes and edges for a two-dimensional grid of squares. Edges having a lower transition score are illustrated in FIG. 6C with dotted lines, and edges having a higher transition score are illustrated with thicker lines. As shown in FIG. 6C, the edges that cross the walls have a lower transition score, while the edges that pass through the two doors have a higher transition score.

After generating 610 the grid map, the spatial indexing system 130 performs an iterative Map Matching algorithm to match the first estimate of the camera path to the grid map. The Map Matching algorithm can be, for example, a Hidden Markov Model (HMM), a conditional random field (CRF), or some other type of Map Matching algorithm.

In the embodiment shown in FIG. 6A, the spatial indexing system 130 performs Map Matching by performing a Markov process to iteratively identify nodes along a path through the grid map that match the first estimate of the camera path.

An iteration of the Markov process begins by identifying 620 one node along the camera path. When the process is initiated, the first node that is identified is the starting point of the camera path. The starting point may be provided as user input or determined based on location data (e.g., GPS or IPS data) received from the image capture system 110.

Once a node has been identified, the spatial indexing system 130 generates 630 scores for a plurality of the other nodes in the grid map. In one embodiment, the spatial indexing system 130 scores every other node in the graph apart from the identified node. In other embodiments, the spatial indexing system 130 scores a subset of the other nodes in the graph. For example, the spatial indexing system 130 scores each node that is separated from the identified node by less than a threshold number of edges (i.e., the spatial indexing system 130 scores the nodes that are close to the identified node). This may be useful, for example, when the grid map includes a large number of nodes and edges and it would be too computationally intensive to score each of the other nodes.

The scores are generated 630 based on the transition scores for the edges between the identified node and the other node. The score is further based on the direction of the first estimate of the camera path near the identified node. For instance, if the first estimate of the camera path travels to the left near the identified node, then a higher score is generated for the edge connecting the identified node to the adjacent node on its left, while lower scores are generated for the edges connecting the identified node to the adjacent nodes above, below, and to the right. The score is also based on the distance traveled by the first estimate of the camera path near the identified node. For example, if the next 6D pose vector on the camera path is 4 feet away, and adjacent nodes in the grid map are separate by a distance of 2 feet, then nodes that are separated from the identified node by two edges are assigned a higher score.

The spatial indexing system 130 uses the scores for each of the other nodes to select 640 one of other nodes as the next nodes along the camera path. The selected node is designated as the new identified node, and the steps of generating scores 630 for other nodes and selecting 640 the next node in the camera path are repeated until nodes along the entire camera path have been identified. The spatial indexing system 130 can then perform a Viterbi algorithm to identify the most likely path through the grid map based on the identified nodes. The identified path can then be provided as the output of the step of generating 440 the combined estimate of the camera path.

VI. Hardware Components

Figure 7:
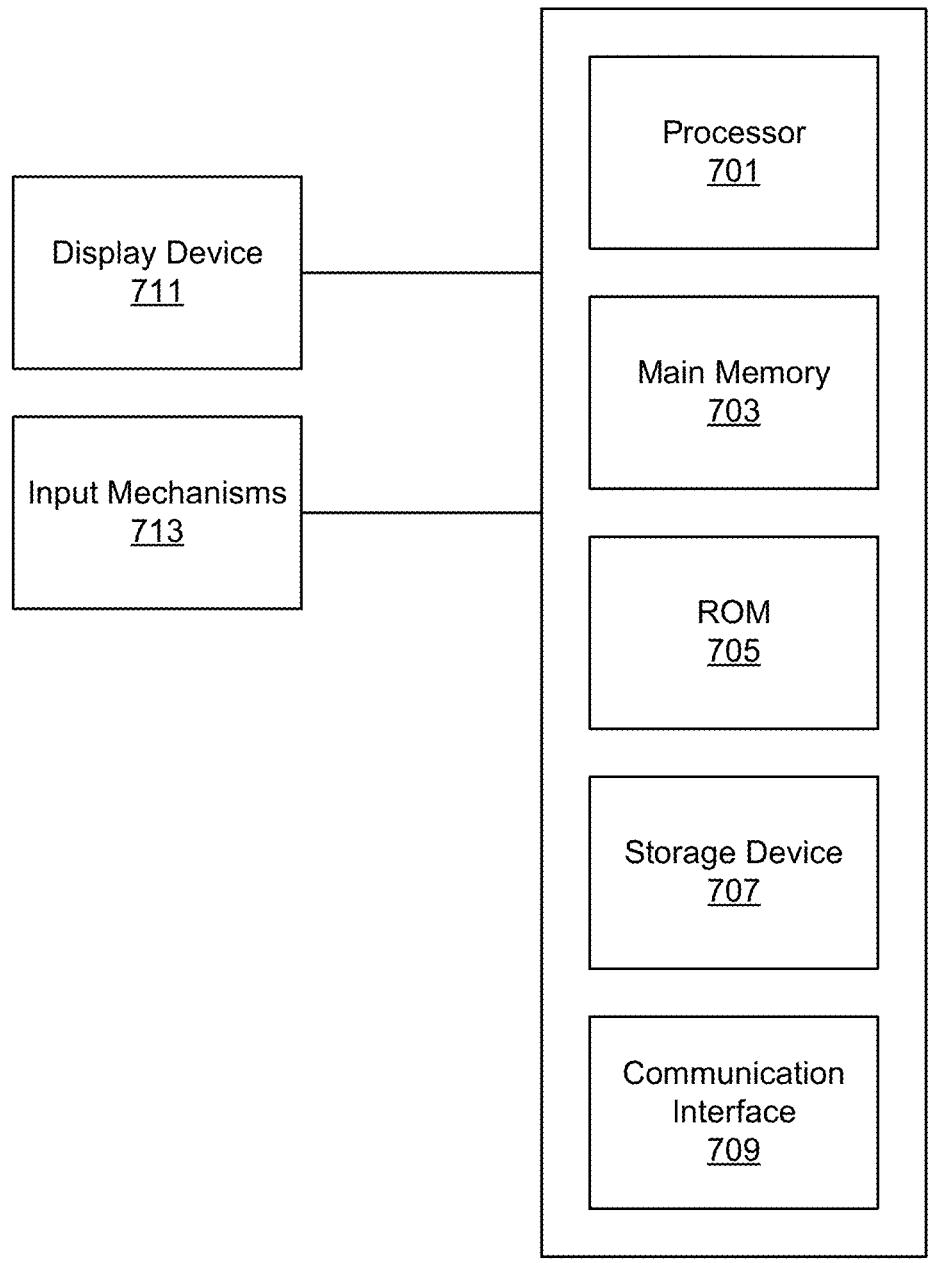
FIG. 7 is a diagram illustrating a computer system that implements the embodiments herein, according to one embodiment.

FIG. 7 is a block diagram illustrating a computer system 700 upon which embodiments described herein may be implemented. For example, in the context of FIG. 1, the video capture system 110, the spatial indexing system 130, and the client device 150 may be implemented using the computer system 700 as described in FIG. 7. The video capture system 110, the spatial indexing system 130, or the client device 150 may also be implemented using a combination of multiple computer systems 700 as described in FIG. 7. The computer system 700 may be, for example, a laptop computer, a desktop computer, a tablet computer, or a smartphone.

In one implementation, the system 700 includes processing resources 701, main memory 703, read only memory (ROM) 705, storage device 707, and a communication interface 709. The system 700 includes at least one processor 701 for processing information and a main memory 703, such as a random access memory (RAM) or other dynamic storage device, for storing information and instructions to be executed by the processor 701. Main memory 703 also may be used for storing temporary variables or other intermediate information during execution of instructions to be executed by processor 701. The system 700 may also include ROM 705 or other static storage device for storing static information and instructions for processor 701. The storage device 707, such as a magnetic disk or optical disk, is provided for storing information and instructions.

The communication interface 709 can enable system 700 to communicate with one or more networks (e.g., the network 140) through use of the network link (wireless or wireline). Using the network link, the system 700 can communicate with one or more computing devices, and one or more servers. The system 700 can also include a display device 711, such as a cathode ray tube (CRT), an LCD monitor, or a television set, for example, for displaying graphics and information to a user. An input mechanism 713, such as a keyboard that includes alphanumeric keys and other keys, can be coupled to the system 700 for communicating information and command selections to processor 701. Other non-limiting, illustrative examples of input mechanisms 713 include a mouse, a trackball, touch-sensitive screen, or cursor direction keys for communicating direction information and command selections to processor 701 and for controlling cursor movement on display device 711. Additional examples of input mechanisms 713 include a radio-frequency identification (RFID) reader, a barcode reader, a three-dimensional scanner, and a three-dimensional camera.

According to one embodiment, the techniques described herein are performed by the system 700 in response to processor 701 executing one or more sequences of one or more instructions contained in main memory 703. Such instructions may be read into main memory 703 from another machine-readable medium, such as storage device 707. Execution of the sequences of instructions contained in main memory 703 causes processor 701 to perform the process steps described herein. In alternative implementations, hard-wired circuitry may be used in place of or in combination with software instructions to implement examples described herein. Thus, the examples described are not limited to any specific combination of hardware circuitry and software.

VII. Additional Configuration Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:
receiving a sequence of images from an image capture system, the sequence of images captured by a camera of the image capture system as the image capture system is moved along a camera path through an environment;
generating a first estimate of the camera path, the first estimate of the camera path specifying, for images in the sequence of images, a position of the image relative to a reference point;
obtaining a floorplan of the environment, the floorplan specifying positions of a plurality of physical features in the environment;
generating a combined estimate of the camera path based on the first estimate of the camera path and the positions of the plurality of physical features specified in the floorplan at least in part by generating a grid map based on the floorplan, the grid map comprising a plurality of nodes and edges, each of the edges connecting a first node and a second node of the plurality of nodes; and
automatically generating an immersive model of the environment based on the combined estimate of the camera path and received sequence of images, the immersive model specifying, for each image of a plurality of the images, a location of the image within the floorplan and at least one route vector defining a spatial distance between the image and at least one of the other images of the plurality of images.

2. The method of claim 1, wherein the camera is a 360-degree camera and the images are 360-degree images.

3. The method of claim 1, wherein the first estimate of the camera path is generated by performing a simultaneous localization and mapping process on the sequence of images.

4. The method of claim 1, wherein global satellite navigation system (GNSS) signals are substantially attenuated in the environment.

5. The method of claim 1, wherein an indoor positioning system (IPS) is not available in the environment.

6. The method of claim 1, further comprising:
receiving motion data from the image capture system, the motion data collected by an inertial measurement unit (IMU) of the image capture system as the image capture system is moved along the camera path;
generating a second estimate of the camera path based on the motion data,
wherein generating the combined estimate of the camera path is further based on the second estimate of the camera path.

7. The method of claim 1, wherein the physical features in the floorplan include a doorway, and wherein the presence of a doorway in the floorplan between the first node and the second node to a higher transition score for the edge between the first node and the second node.

8. The method of claim 1, wherein the physical features in the floorplan include a wall, and wherein the presence of a wall in the floorplan between the first node and the second node leads to a lower transition score for the edge between the first node and the second node.

9. The method of claim 1, wherein generating the combined estimate of the camera path comprises:
performing a map matching process on the grid map and the first estimate of the camera path to generate the combined estimate of the camera path.

10. The method of claim 9, wherein performing the map matching process comprises:
identifying a node along the camera path;
generating a score for each of a plurality of other nodes in the grid map, the score for each of the other nodes generated based on the transition scores for the one or more edges between the identified node and the other node;
identifying one of the other nodes having a highest score; and
selecting the identified other node as a next node along the camera path.

11. The method of claim 1, further comprising:
determining, for each image in the sequence of images, an orientation of the camera when the image was captured.

12. The method of claim 1, wherein generating the first estimate of the camera path comprises generating a plurality of camera path segments.

13. The method of claim 12, wherein generating the combined estimate of the camera path comprises aligning each camera path segment of the plurality of camera path segments with the floorplan, the aligning of each camera path segment comprising:
generating a plurality of candidate camera paths, each of the candidate camera paths generated by performing one or more of a scaling operation and a rotation operation on the camera path segment,
generating a consistency score for each of the candidate camera paths, the consistency score representing a degree of consistency between the candidate camera path and the physical features in the floorplan; and
selecting the candidate camera path having the highest consistency score.

14. A method comprising:
receiving a sequence of images from an image capture system, the sequence of images captured by a camera of the image capture system as the image capture system is moved along a camera path through an environment;
generating a first estimate of the camera path, the first estimate of the camera path specifying, for images in the sequence of images, a position of the image relative to a reference point;
obtaining a floorplan of the environment, the floorplan specifying positions of a plurality of physical features in the environment;
scaling the first estimate of the camera path to align with the positions of the plurality of physical features specified in the floorplan; and
automatically generating an immersive model of the environment based on the scaled first estimate of the camera path and received sequence of images.

15. The method of claim 14, wherein the camera is a 360-degree camera and the images are 360-degree images.

16. The method of claim 14, wherein the first estimate of the camera path is generated by performing a simultaneous localization and mapping process on the sequence of images.

17. The method of claim 14, wherein global satellite navigation system (GNSS) signals are substantially attenuated in the environment.

18. The method of claim 14, wherein an indoor positioning system (IPS) is not available in the environment.

19. The method of claim 14, further comprising:
receiving motion data from the image capture system, the motion data collected by an inertial measurement unit (IMU) of the image capture system as the image capture system is moved along the camera path;
generating a second estimate of the camera path based on the motion data,
wherein generating the scaled first estimate of the camera path is further based on the second estimate of the camera path.

20. A method comprising:
receiving a sequence of images from an image capture system, the sequence of images captured by a camera of the image capture system as the image capture system is moved along a camera path through an environment;
generating a first estimate of the camera path, the first estimate of the camera path specifying, for images in the sequence of images, a position of the image relative to a reference point;
obtaining a floorplan of the environment, the floorplan specifying positions of a plurality of physical features in the environment;
generating a plurality of candidate estimates of the camera path, the candidate estimates of the camera path generated by performing one or more of a scaling operation, a rotating operation, and a translation operation on the first estimate of the camera path;
generating a consistency score for each of the candidate estimates of the camera path, the consistency score representing the degree of consistency between the candidate estimate of the camera path and the physical features in the floorplan;
determining the combined estimate of the camera path by selecting the candidate estimate of the camera path with the highest consistency score; and
automatically generating an immersive model of the environment based on the estimate of the camera path and received sequence of images.

\* \* \* \* \*